US008820445B2

(12) United States Patent
Kikuchi

(10) Patent No.: US 8,820,445 B2
(45) Date of Patent: Sep. 2, 2014

(54) CHARGE/DISCHARGE CONTROL DEVICE AND CHARGE/DISCHARGE CONTROL METHOD FOR POWER STORAGE DEVICE, AND ELECTRIC-POWERED VEHICLE

(75) Inventor: Yoshiaki Kikuchi, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 242 days.

(21) Appl. No.: 12/226,317

(22) PCT Filed: May 11, 2007

(86) PCT No.: PCT/JP2007/060178
§ 371 (c)(1),
(2), (4) Date: Oct. 15, 2008

(87) PCT Pub. No.: WO2007/132929
PCT Pub. Date: Nov. 22, 2007

(65) Prior Publication Data
US 2009/0266631 A1 Oct. 29, 2009

(30) Foreign Application Priority Data

May 15, 2006 (JP) ................. 2006-135383

(51) Int. Cl.
B60W 10/26 (2006.01)
B60L 11/14 (2006.01)
(Continued)

(52) U.S. Cl.
CPC ............ *H01M 10/44* (2013.01); *B60L 11/14* (2013.01); *B60L 11/123* (2013.01); *Y02T 10/7044* (2013.01); *Y02T 10/705* (2013.01); *Y02T 10/7077* (2013.01); *Y02E 60/12* (2013.01); *H01M 10/443* (2013.01); *H02J 7/0057* (2013.01); *Y02T 10/7005* (2013.01); *Y02T 10/7022* (2013.01); *B60L 11/1861* (2013.01); *H01M 10/48* (2013.01); *Y02T 10/6217* (2013.01)
USPC ............ 180/65.265; 180/65.275; 180/65.29; 320/132

(58) Field of Classification Search
USPC .......................... 180/65.21, 65.265; 320/132
See application file for complete search history.

(56) References Cited

U.S. PATENT DOCUMENTS 5,844,342 A 12/1998 Miyatani et al.
(Continued)

FOREIGN PATENT DOCUMENTS

JP A-11-187577 7/1999
(Continued)

OTHER PUBLICATIONS

Jul. 9, 2012 Office Action issued in Canadian Patent Application No. 2,651,144.

Primary Examiner — Jeffrey J Restifo
Assistant Examiner — Erez Gurari
(74) Attorney, Agent, or Firm — Oliff PLC

(57) ABSTRACT

A maximum dischargeable current Idmax obtained when electric power output from a battery is increased from a battery current Ib and a battery voltage Vb at present under internal resistance R at present (an operating point 510) until the battery voltage reaches a lower limit voltage Ve (an operating point 520), is shown as follows: Idmax=Ib+(Vb−Ve)/R. Therefore, in accordance with multiplication of the lower limit voltage Ve and the maximum dischargeable current Idmax, it is possible to predict maximum dischargeable electric power at which the battery voltage does not become lower than the lower limit voltage even if discharge limitation is temporarily relaxed, as a relative value with respect to the battery voltage and the battery current at present. When the discharge electric power limitation for the battery (the power storage device) is temporarily relaxed in accordance with a discharge request made by a load, a discharge electric power permissible value is set to correspond to the maximum dischargeable electric power, such that the output voltage of the power storage device does not fall outside a controlled voltage range from the lower limit voltage to an upper limit voltage.

31 Claims, 6 Drawing Sheets

(51) Int. Cl.
*H01M 10/44* (2006.01)
*B60L 11/12* (2006.01)
*H02J 7/00* (2006.01)
*B60L 11/18* (2006.01)
*H01M 10/48* (2006.01)

(56) References Cited

U.S. PATENT DOCUMENTS

| | | | |
|---|---|---|---|
| 6,075,346 | A | 6/2000 | Kikuchi et al. |
| 6,232,744 | B1 | 5/2001 | Kawai et al. |
| 6,727,670 | B1 * | 4/2004 | Grabowski et al. ........... 318/432 |
| 7,075,306 | B2 | 7/2006 | Emori et al. |
| 7,173,396 | B2 * | 2/2007 | Gunji ........................... 320/132 |
| 2003/0052650 | A1 | 3/2003 | Gunji |
| 2003/0195719 | A1 * | 10/2003 | Emori et al. .................. 702/183 |
| 2004/0138785 | A1 * | 7/2004 | Emori et al. .................. 700/286 |
| 2006/0012372 | A1 | 1/2006 | Emori et al. |
| 2006/0087291 | A1 * | 4/2006 | Yamauchi ..................... 320/137 |

FOREIGN PATENT DOCUMENTS

| | | |
|---|---|---|
| JP | A-2000-258514 | 9/2000 |
| JP | A-2001-177918 | 6/2001 |
| JP | A-2002-058113 | 2/2002 |
| JP | A-2003-068370 | 3/2003 |
| JP | A-2003-092804 | 3/2003 |
| JP | A-2004-215459 | 7/2004 |

* cited by examiner

CHARGE/DISCHARGE CONTROL DEVICE AND CHARGE/DISCHARGE CONTROL METHOD FOR POWER STORAGE DEVICE, AND ELECTRIC-POWERED VEHICLE

TECHNICAL FIELD

The present invention relates to a charge/discharge control device for a power storage device, a charge/discharge control method for a power storage device, and an electric-powered vehicle, and more specifically relates to charge/discharge control for maintaining an output voltage of the power storage device within a controlled voltage range from a lower limit voltage to an upper limit voltage.

BACKGROUND ART

There has widely been used a system that drives and controls an electrical apparatus serving as a load, while a power storage device, a typical example of which is a secondary battery (hereinafter also simply referred to as a battery), is being charged/discharged. For example, such a system is applied to a hybrid vehicle configured to include an engine, a motor generator that functions as an electric motor or an electric power generator, and a battery that receives electric power from and transmits electric power to the motor generator for charge/discharge.

Japanese Patent Laying-Open No. 2002-58113 (hereinafter referred to as Patent Document 1) discloses a configuration of a mechanical power output device configured such that, to allow a battery mounted on a hybrid vehicle, as described above, to fully exhibit its performance, a battery output limit is temporarily relaxed up to an instantaneous output larger than a rated output exclusively for prescribed power allowable time, when an output requested from the battery exceeds the rated output.

Similarly, Japanese Patent Laying-Open No. 2003-92804 (hereinafter referred to as Patent Document 2) discloses, as a control device for a hybrid vehicle, a configuration that variably sets permissible capacitance to be used and permissible time to be used during charge/discharge of a battery, in accordance with a running condition of the vehicle, so as to provide satisfactory driving performance and ensure durability of the battery by performing charge/discharge control for the battery in accordance with a driving request. It is particularly disclosed that, on a condition that large electric power must be supplied or recovered during short time, a margin of the battery is made smaller to satisfy a request for a charge/discharge current, and a duration of charge/discharge is set shorter to prevent the total quantity of charge/discharge from being excessively large.

Further, Japanese Patent Laying-Open No. 11-187577 (hereinafter referred to as Patent Document 3) discloses that a limit value for charge/discharge electric power is set in accordance with a battery temperature and a power storage quantity (SOC: State of Charge), so as to perform charge/discharge with appropriate electric power suitable for a state of the battery and an environment where the battery is used.

Further, Japanese Patent Laying-Open No. 2004-215459 (hereinafter referred to as Patent Document 4) discloses a power supply control device for reducing charge time required for a plurality of connected power storage means and reducing capacitance relative to a discharge current value, and for performing charge/discharge control so as to avoid occurrence of abnormalities in the power storage means. It is particularly disclosed that, in this power supply control device, internal impedance (internal resistance) of the plurality of power storage means (batteries) connected in parallel is successively measured based on data of detected current and voltage, and the secondary battery is charged/discharged based on the determined impedance, and a maximum voltage value and a minimum voltage value.

As shown in Patent Document 4 as well, charge/discharge control for the battery must be performed so as not to allow a battery output voltage to fall outside a controlled voltage range from a minimum permissible voltage (lower limit voltage) to a maximum permissible voltage (upper limit voltage) owing to overdischarge or overcharge. Particularly in the control configuration that temporarily relaxes charge/discharge limitation in accordance with a request from a load, as in Patent Documents 1 and 2, consideration must be given at this time so as not to allow the battery output voltage to fall outside the controlled voltage range described above.

In this regard, Patent Document 1, for example, discloses that an instantaneous output permissible for short time is determined from a battery temperature and remaining capacity (SOC) at that time. Further, Patent Document 2 discloses that a current quantity relaxed under charge/discharge limitation is determined based on an SOC at present and a battery margin set in accordance with a driving circumstance.

However, in the configurations disclosed in Patent Documents 1 and 2, a battery voltage at each time point, which momentarily varies, is not considered, and hence it is difficult to accurately set a relaxed level of charge/discharge limitation permitted exclusively for short time, within a range from a lower limit voltage to an upper limit voltage. Therefore, depending on a charge/discharge history by that point in time, the battery voltage may be excessively lowered, and hence may become lower than a lower limit voltage when discharge limitation is relaxed. Alternatively, in the case where SOC estimation accuracy is degraded, the battery voltage may become lower than a lower limit voltage when discharge limitation is relaxed. In view of this, if a relaxed level of charge/discharge limitation is determined to ensure safety so as not to allow the battery voltage to be higher than an upper limit voltage and lower than a lower limit voltage, temporarily permissible charge/discharge electric power becomes small, and hence there arises a problem of not being able to obtain the best performance from the battery.

DISCLOSURE OF THE INVENTION

The present invention has been made to solve the above-described problems. An object of the present invention is to provide a charge/discharge control device for a power storage device such as a secondary battery, capable of accurately setting a charge/discharge electric power permissible value such that an output voltage of the power storage device does not fall outside a voltage range from a lower limit voltage to an upper limit voltage, when charge/discharge limitation for the power storage device is temporarily limited, and an electric-powered vehicle mounted with the same.

A charge/discharge control device for a power storage device according to the present invention is a charge/discharge control device for maintaining an output voltage of the power storage device within a voltage range from a lower limit voltage to an upper limit voltage, and includes: state obtaining means, first limitation setting means, second limitation setting means, and internal resistance estimating means. The state obtaining means obtains measurement values which indicate a state of the power storage device. The first limitation setting means sets a discharge electric power permissible value and a charge electric power permissible value for charge/discharge electric power limitation for the power storage device. The second limitation setting means temporarily relaxes the charge/discharge electric power limitation relative to the charge/discharge electric power limitation set by the first limitation setting means, in accordance with a request from a load of the power storage device. The internal resistance estimating means estimates internal resistance of the power storage device, based on the measurement values obtained by the state obtaining means. In particular, the second limitation setting means includes predicting means and permissible value setting means. The predicting means predicts at least one of discharge electric power and charge electric power of the power storage device at which the output voltage reaches the lower limit voltage and the upper limit voltage owing to increase in discharge electric power and charge electric power, respectively, based on a battery voltage and a battery current in the measurement values obtained by the state obtaining means and the internal resistance estimated by the internal resistance estimating means. The permissible value setting means sets at least one of the discharge electric power permissible value and the charge electric power permissible value, in accordance with at least one of the discharge electric power and the charge electric power predicted by the predicting means.

A charge/discharge control method for a power storage device according to the present invention is a charge/discharge control method for maintaining an output voltage of the power storage device within a voltage range from a lower limit voltage to an upper limit voltage, and includes the steps of: obtaining measurement values which indicate a state of the power storage device; setting a discharge electric power permissible value and a charge electric power permissible value for charge/discharge electric power limitation for the power storage device; temporarily relaxing the charge/discharge electric power limitation relative to the charge/discharge electric power limitation set by the setting step, in accordance with a request from a load of the power storage device; and estimating internal resistance of the power storage device, based on the obtained measurement values. In particular, the relaxing step includes the substeps of predicting at least one of discharge electric power and charge electric power of the power storage device at which the output voltage reaches the lower limit voltage and the upper limit voltage owing to increase in discharge electric power and charge electric power, respectively, based on a battery voltage and a battery current in the obtained measurement values and the estimated internal resistance, and setting at least one of the discharge electric power permissible value and the charge electric power permissible value, in accordance with at least one of the discharge electric power and the charge electric power predicted by the predicting substep.

According to the charge/discharge control device for the power storage device or the charge/discharge control method for the power storage device described above, it is possible to predict with high accuracy an electric power limitation value (maximum dischargeable electric power and maximum chargeable electric power) at which the output voltage reaches a lower limit voltage or an upper limit voltage as the charge/discharge limitation is relaxed, based on a voltage and a current at a present point in time, and determine at least one of the discharge electric power permissible value and the charge electric power permissible value at relaxation of the charge/discharge limitation relative to that in a normal state, such that at least one of them corresponds to the predicted maximum dischargeable electric power and/or maximum chargeable electric power. Therefore, when the charge/discharge limitation is temporarily relaxed in accordance with a request from the load, it is possible to sufficiently ensure a relaxed level of charge/discharge electric power, while preventing the output voltage of the power storage device from falling outside the controlled voltage range. As a result, it is possible to perform charge/discharge control such that the output voltage is maintained within the controlled voltage range, while allowing the power storage device to sufficiently exhibit its performance Preferably, the predicting means determines a discharge current permissible increased quantity of the power storage device by dividing a voltage difference between the battery voltage at present and the lower limit voltage by the internal resistance, and predicts the discharge electric power at which the output voltage reaches the lower limit voltage, in accordance with multiplication of the lower limit voltage and a discharge current which is expressed as a sum of the discharge current permissible increased quantity and the battery current. Alternatively, the predicting substep determines a discharge current permissible increased quantity of the power storage device by dividing a voltage difference between the battery voltage at present and the lower limit voltage by the internal resistance, and predicts the discharge electric power at which the output voltage reaches the lower limit voltage, in accordance with multiplication of the lower limit voltage and a discharge current which is expressed as a sum of the discharge current permissible increased quantity and the battery current.

With such a configuration, it is possible to predict maximum dischargeable electric power with high accuracy with a simple operation, based on a voltage and a current of the power storage device at present and the estimated internal resistance.

Preferably, the predicting means determines a charge current permissible increased quantity of the power storage device by dividing a voltage difference between the battery voltage at present and the upper limit voltage by the internal resistance, and predicts the charge electric power at which the output voltage reaches the upper limit voltage, in accordance with multiplication of the upper limit voltage and a charge current which is expressed as a sum of the charge current permissible increased quantity and the battery current. Alternatively, the predicting substep determines a charge current permissible increased quantity of the power storage device by dividing a voltage difference between the battery voltage at present and the upper limit voltage by the internal resistance, and predicts the charge electric power at which the output voltage reaches the upper limit voltage, in accordance with multiplication of the upper limit voltage and a charge current which is expressed as a sum of the charge current permissible increased quantity and the battery current.

With such a configuration, it is possible to predict maximum chargeable electric power with high accuracy with a simple operation, based on a voltage and a current of the power storage device at present and the estimated internal resistance.

An electric-powered vehicle according to the present invention is an electric-powered vehicle which includes the power storage device, an internal combustion engine for generating vehicle drive power, a first electric motor and a second electric motor each configured to be able to receive electric power from and transmit electric power to the power storage device in a bidirectional manner, and the charge/discharge control device described above. The first electric motor is configured to be able to start the internal combustion engine, by being driven and rotated by discharge electric power of the power storage device. The second electric motor is configured to be able to generate the vehicle drive power by the discharge electric power of the power storage device, independently of the internal combustion engine. The charge/discharge control device sets the discharge electric power permissible value by the second limitation setting means, at least one of when the internal combustion engine is started, and when an output request to the second electric motor is at least a prescribed level.

Alternatively, in the control method for the power storage device, the power storage device is mounted on an electric-powered vehicle which includes an internal combustion engine for generating vehicle drive power and an electric motor configured to be able to receive electric power from and transmit electric power to the power storage device in a bidirectional manner. The electric motor is configured to be able to generate the vehicle drive power by discharge electric power of the power storage device, independently of the internal combustion engine, and to be able to generate charge electric power of the power storage device by regenerative braking power generation caused by regenerative torque being generated when the electric-powered vehicle is decelerated. The relaxing step sets the charge electric power permissible value by the setting substep, when an absolute value of the regenerative torque requested from the electric motor is determined to be at least a prescribed value.

With this configuration, in the electric-powered vehicle (a hybrid motor vehicle or the like) mounted with the internal combustion engine, the power storage device, and the electric motor configured to be able to receive electric power from and transmit electric power to the power storage device in a bidirectional manner, and in a driving circumstance where a discharge request to the power storage device is larger relative to that in a normal state, it is possible to temporarily relax the discharge limitation, while preventing the output voltage of the power storage device from decreasing below the lower limit voltage.

Further, an electric-powered vehicle according to the present invention is an electric-powered vehicle that includes the power storage device, an internal combustion engine for generating vehicle drive power, an electric motor configured to be able to receive electric power from and transmit electric power to the power storage device in a bidirectional manner, and the charge/discharge control device described above. The electric motor is configured to be able to generate the vehicle drive power by discharge electric power of the power storage device independently of the internal combustion engine, and to be able to generate charge electric power of the power storage device by regenerative braking power generation caused by regenerative torque being generated when the electric-powered vehicle is decelerated. The charge/discharge control device sets the charge electric power permissible value by the second limitation setting means, when an absolute value of the regenerative torque requested from the electric motor is determined to be at least a prescribed value.

Alternatively, in the control method for the power storage device, the power storage device is mounted on an electric-powered vehicle which includes an internal combustion engine for generating vehicle drive power and an electric motor configured to be able to receive electric power from and transmit electric power to the power storage device in a bidirectional manner. The electric motor is configured to be able to generate the vehicle drive power by discharge electric power of the power storage device independently of the internal combustion engine, and to be able to generate charge electric power of the power storage device by regenerative braking power generation caused by regenerative torque being generated when the electric-powered vehicle is decelerated. The relaxing step sets the charge electric power permissible value by the setting substep, when an absolute value of the regenerative torque requested from the electric motor is determined to be at least a prescribed value.

With such a configuration, in the electric-powered vehicle (a hybrid motor vehicle or the like) mounted with the internal combustion engine, the power storage device, and the electric motor configured to be able to receive electric power from and transmit electric power to the power storage device in a bidirectional manner, and in a driving circumstance where an absolute value of the regenerative torque requested from the electric motor is larger than a prescribed value and a charge request to the power storage device is larger relative to that in a normal state, such as when the brake is manipulated during high-speed running, or when a deceleration degree is large owing to the brake manipulation or the like even during running at a relatively low speed, it is possible to temporarily relax the charge limitation, while preventing the output voltage of the power storage device from being higher than the upper limit voltage.

Therefore, according to the present invention, it is possible to accurately set a charge/discharge electric power permissible value at temporary relaxation of the charge/discharge limitation for the power storage device, such that the output voltage of the power storage device does not fall outside a voltage range from a lower limit voltage to an upper limit voltage.

BEST MODES FOR CARRYING OUT THE INVENTION

Figure 1:
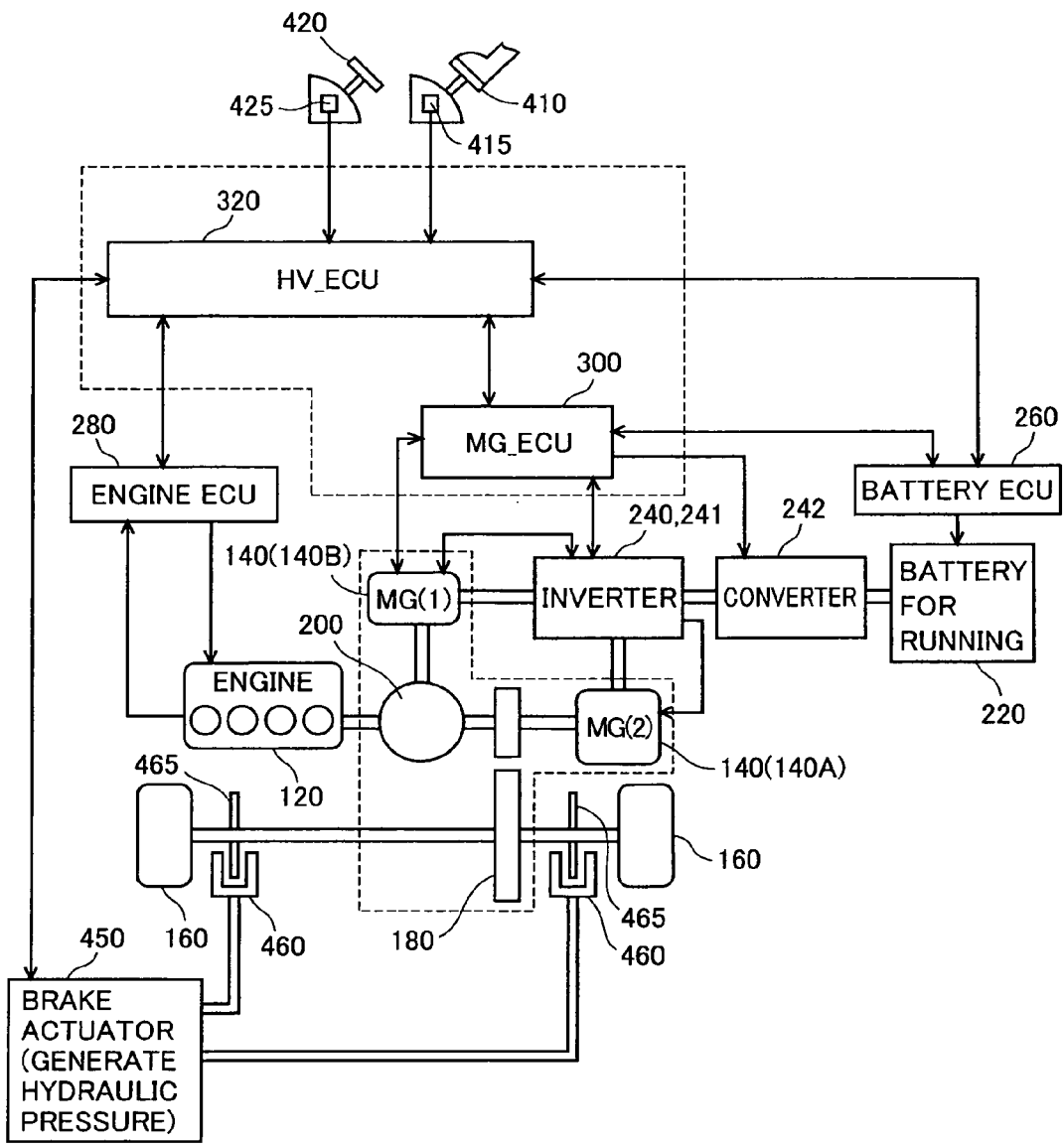
FIG. 1 is a control block diagram of a hybrid vehicle shown as a representative example of an electric-powered vehicle mounted with a charge/discharge control device for a power storage device according to an embodiment of the present invention.

An embodiment of the present invention will hereinafter be described in detail with reference to the drawings. Note that the same or corresponding portions in the drawings are provided with the same reference characters in the following and the description thereof will not be repeated in principle.

FIG. 1 is a control block diagram of a hybrid vehicle shown as a representative example of an electric-powered vehicle mounted with a control device for a power storage device according to an embodiment of the present invention. Note that the electric-powered vehicle is not limited to the hybrid vehicle shown in FIG. 1, and the present invention may also be applied to a hybrid vehicle of another mode (e.g. a series-type hybrid vehicle) or an electric vehicle, as long as the vehicle is configured to be able to recover energy caused by regenerative power generation during deceleration of the vehicle and store the same in the power storage device.

In the present embodiment below, a secondary battery (battery) is shown as an example of the power storage device. However, it is described for confirmation that a power storage device in another form such as a capacitor, a representative example of which is an electric double layer capacitor, may also be used.

With reference to FIG. 1, the hybrid vehicle includes an internal combustion engine (hereinafter simply referred to as an engine) 120 such as a gasoline engine or a diesel engine, and a motor generator (MG) 140, as a drive source. Motor generator 140 includes a motor generator 140A (hereinafter also expressed as a motor 140A for convenience of description) that mainly functions as a motor, and a motor generator 140B (hereinafter also expressed as a motor 140B for convenience of description) that mainly functions as a generator. Note that motor 140A functions as a generator, or generator 140B functions as a motor, in accordance with a running state of the hybrid vehicle.

In addition, the hybrid vehicle includes a speed reducer 180 that transmits mechanical power generated by engine 120 and motor generator 140A to a drive wheel 160, and transmits drive power of drive wheel 160 to engine 120 and motor generator 140A, a power split device (e.g. a planetary gear mechanism) 200 that distributes mechanical power generated by engine 120 between two paths, namely, drive wheel 160 and generator 140B, a battery 220 for running that serves as a power storage device for storing electric power for driving motor generators 140A, 140B, an inverter 240 that performs current control by making a conversion between a direct current in battery 220 for running and an alternating current in motor generator 140A, an inverter 241 that performs current control by making a conversion between a direct current in battery 220 for running and an alternating current in motor generator 140B, a battery control unit (hereinafter referred to as a battery ECU (Electronic Control Unit)) 260 that manages and controls a charge/discharge state of battery 220 for running, an engine ECU 280 that controls an operating state of engine 120, an MG_ECU 300 that controls motor generators 140A, 140B, battery ECU 260, inverter 240, and others in accordance with a state of the hybrid vehicle, and an HV_ECU 320 that manages and controls battery ECU 260, engine ECU 280, MG_ECU 300, and others in an interrelated manner to control the entire hybrid system such that the hybrid vehicle can travel most efficiently.

To an accelerator pedal 410 manipulated by a driver, an accelerator pedal sensor 415 is connected. Accelerator pedal sensor 415 generates an output voltage that corresponds to a manipulated degree (press-down degree) of accelerator pedal 410 by the driver. Similarly, to a brake pedal 420 manipulated by the driver, a brake pedal sensor 425 is connected. Brake pedal sensor 425 generates an output voltage that corresponds to a manipulated degree (press-down degree) of brake pedal 420 by the driver. The output voltages of accelerator pedal sensor 415 and brake pedal sensor 425 are transmitted to HV_ECU 320. HV_ECU 320 can therefore sense the manipulated degree (press-down degree) of each of accelerator pedal 410 and brake pedal 420 by the driver.

In the present embodiment, a converter 242 is provided between battery 220 for running and inverter 240. Thereby, even if a rated voltage of battery 220 for running is lower than a rated voltage of motor generator 140A or motor generator 140B, the voltage can be stepped up or stepped down by converter 242 so that electric power can be received and transmitted between battery 220 for running and motor generators 140A, 140B. Converter 242 has a smoothing capacitor embedded therein, and can store electric charge in the smoothing capacitor when performing a step-up operation.

Note that, although the ECUs are separately configured in FIG. 1, it may be possible to adopt a configuration in which two or more of the ECUs may be integrated into an ECU (e.g. as shown in FIG. 1 by a dotted line, an ECU in which MG_ECU 300 and HV_ECU 320 are integrated is an example thereof).

Power split device 200 uses a planetary gear mechanism (a planetary gear) for allotting mechanical power of engine 120 to both of drive wheel 160 and motor generator 140B. By controlling a rotation speed of motor generator 140B, power split device 200 also functions as a continuously variable transmission. Rotary force of engine 120 is input to a planetary carrier (C), and transmitted by a sun gear (S) to motor generator 140B and transmitted by a ring gear (R) to the motor and an output shaft (a side of drive wheel 160). When rotating engine 120 is to be stopped, engine 120 is rotating, and hence kinetic energy of this rotation is converted into electric energy by motor generator 140B, so that a rotation speed of engine 120 is lowered.

The hybrid vehicle mounted with the hybrid system, as shown in FIG. 1, is run only by motor 140A in motor generator 140 at startup, during low-speed running, or the like, when efficiency of engine 120 is low. During normal running, mechanical power of engine 120 is divided by power split device 200, for example, to be provided to two paths, so that drive wheel 160 is directly driven, while generator 140B is driven to generate electric power. At this time, the generated electric power is used to drive motor 140A to assist driving of drive wheel 160. Further, during high-speed running, electric power from battery 220 for running is further supplied to motor 140A to increase an output of motor 140A, so that drive power is additionally provided to drive wheel 160.

In contrast, during deceleration, motor 140A that is driven by drive wheel 160 functions as a generator and generates electric power by regenerative braking, so that the recovered electric power can be stored in battery 220 for running. Note that the regenerative braking herein includes braking accompanied by regenerative power generation performed when the driver that drives the hybrid motor vehicle manipulates the foot brake, and deceleration of the vehicle (or stop of acceleration) accompanied by regenerative power generation performed by moving the driver's foot off the accelerator pedal even if the foot brake is not manipulated.

Electric power to be regeneratively generated is set in accordance with a charge electric power permissible value for battery 220 for running. In other words, when charge of battery 220 for running is inhibited, regenerative power generation is also inhibited, and a torque command value for motor generator 140A is set to zero.

In contrast, if a quantity of charge of battery 220 for running is lowered and charge is particularly required, an output of engine 120 is increased to increase a quantity of electric power generated by generator 140B, so that a quantity of charge for battery 220 for running is increased. Of course even during low-speed running, control is provided as needed such that an output of engine 120 is increased. For example, such a control is provided in the case where charge of battery 220 for running is required, as described above, the case where auxiliary equipment such as an air conditioner is driven, the case where a temperature of cooling water for engine 120 is raised to a prescribed temperature, and other cases.

Each of drive wheel 160 and wheels not shown is provided with a brake mechanism 460. Brake mechanism 460 is configured such that braking force for the vehicle can be obtained by frictional force generated by a disk rotor 465, which is provided to correspond to each wheel, being pressed down by a brake pad (a friction member) operated by hydraulic pressure generated by a brake actuator 450. A quantity of hydraulic pressure to be generated by brake actuator 450 is controlled by HV_ECU 320.

HV_ECU 320 provides control such that requested braking force in the entire vehicle is calculated from a press-down degree of brake pedal 420, and others, and that the calculated, requested braking force for the entire vehicle is generated in a coordinated manner by regenerative braking force caused by motor 140A and hydraulic pressure braking force caused by brake mechanism 460.

Figure 2:
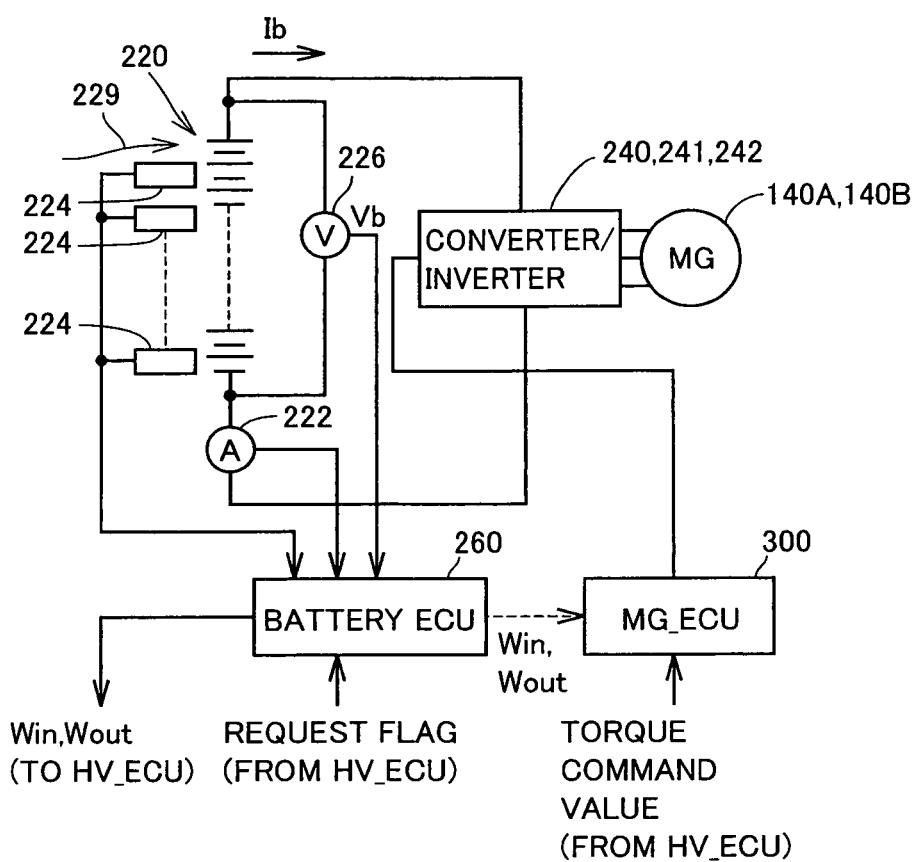
FIG. 2 is a block diagram that shows a schematic configuration of charge/discharge control for the power storage device according to the embodiment of the present invention.

FIG. 2 shows a schematic configuration of charge/discharge control for the power storage device according to the embodiment of the present invention.

Battery 220 for running, which is shown as an example of the power storage device, is an assembled battery in which a plurality of cells are connected in series, as shown in the drawing, and is configured with a secondary battery such as a lead-acid battery, a lithium-ion battery, or a nickel-hydrogen battery. Battery 220 for running is connected to motor generators 140A, 140B (MG (1), MG (2)) via inverters 240, 241 and converter 242. In other words, in the present embodiment, inverters 240, 241 and converter 242, and motor generators 140A, 140B (MG (1), MG (2)) integrally configure a load of battery 220 for running.

Further, a voltage sensor 226 that detects a terminal voltage of battery 220 for running (hereinafter referred to as a battery voltage Vb), and a current sensor 222 that detects a current that flows through battery 220 for running are provided. In the following, an input/output current between battery 220 for running and the load, detected by current sensor 222, is referred to as a battery current Ib. Note that, as to battery current Ib, an arrow direction in the drawing is defined as a positive current direction. In other words, Ib>0 (positive) during discharge, while Ib<0 (negative) during charge. Therefore, input/output electric power of battery 220 for running with respect to the load is shown as a product of battery voltage Vb and battery current Ib, and assumes a positive value during discharge and a negative value during charge.

Further, a temperature sensor 224 that detects a battery temperature is provided at each of a plurality of sites of battery 220 for running. The reason why temperature sensor 224 is provided at each of the plurality of sites is that a temperature of battery 220 for running may vary locally. An output of each of current sensor 222, voltage sensor 226, and temperature sensor 224 is transmitted to battery ECU 260.

Based on these sensor output values, battery ECU 260 calculates a remaining capacity (SOC) of the battery, and further performs battery charge/discharge limitation. The charge/discharge control is performed such that an estimated SOC matches a target SOC, and that battery voltage Vb does not become higher than a maximum permissible voltage (an upper limit voltage Vu) owing to overcharge and battery voltage Vb does not become lower than a minimum permissible voltage (a lower limit voltage Ve) owing to overdischarge. Here, upper limit voltage Vu and lower limit voltage Ve are determined in accordance with a maximum rated voltage and a minimum rated voltage of battery 220 for running, an operable (guaranteed) voltage of an apparatus (a load) connected to battery 220 for running, and others.

Particularly, as described above, battery ECU 260 determines a charge electric power permissible value Win (Win≤0) and a discharge electric power permissible value Wout (Wout≥0) as to battery 220 for running such that battery voltage Vb is maintained within a voltage range from lower limit voltage Ve to upper limit voltage Vu (hereinafter also referred to as a controlled voltage range), and transmits them to MG_ECU 300 and HV_ECU 320.

HV_ECU 320, in particular, sets an operation command value (a representative example of which is a torque command value) for each of motor generators 140A, 140B such that battery 220 for running is charged/discharged within a range from charge electric power permissible value Win to discharge electric power permissible value Wout. For example, allocation of an output of vehicle drive power between engine 120 and motor 140A in accordance with a running circumstance, as described above, is considered such that electric power output from battery 220 for running, which includes electric power to be consumed by motor 140A, does not exceed discharge electric power permissible value Wout.

Alternatively, during regenerative braking, a torque command value (generally negative torque) for motor generator 140A is set by ensuring that electric power input to battery 220 for running, which includes electric power generated by motor generator 140A, does not exceed charge electric power permissible value Win. Note that, when the driver manipulates the brake, HV_ECU 320 provides coordinated control such that requested braking force for the entire vehicle is obtained from a sum of regenerative braking force caused by motor generator 140A and hydraulic pressure braking force caused by brake mechanism 460, as described above, and hence even if the regenerative braking force caused by motor generator 140A is limited by charge electric power permissible value Win, it is possible to obtain required vehicle braking force. Further, a request flag that requests temporary relaxation of the charge/discharge limitation is input to battery ECU 260 from HV_ECU 320. The request flag will later be described in detail.

Next, discharge electric power limitation according to the embodiment of the present invention will now be described with the use of FIG. 3 and FIG. 4.

Figure 3:
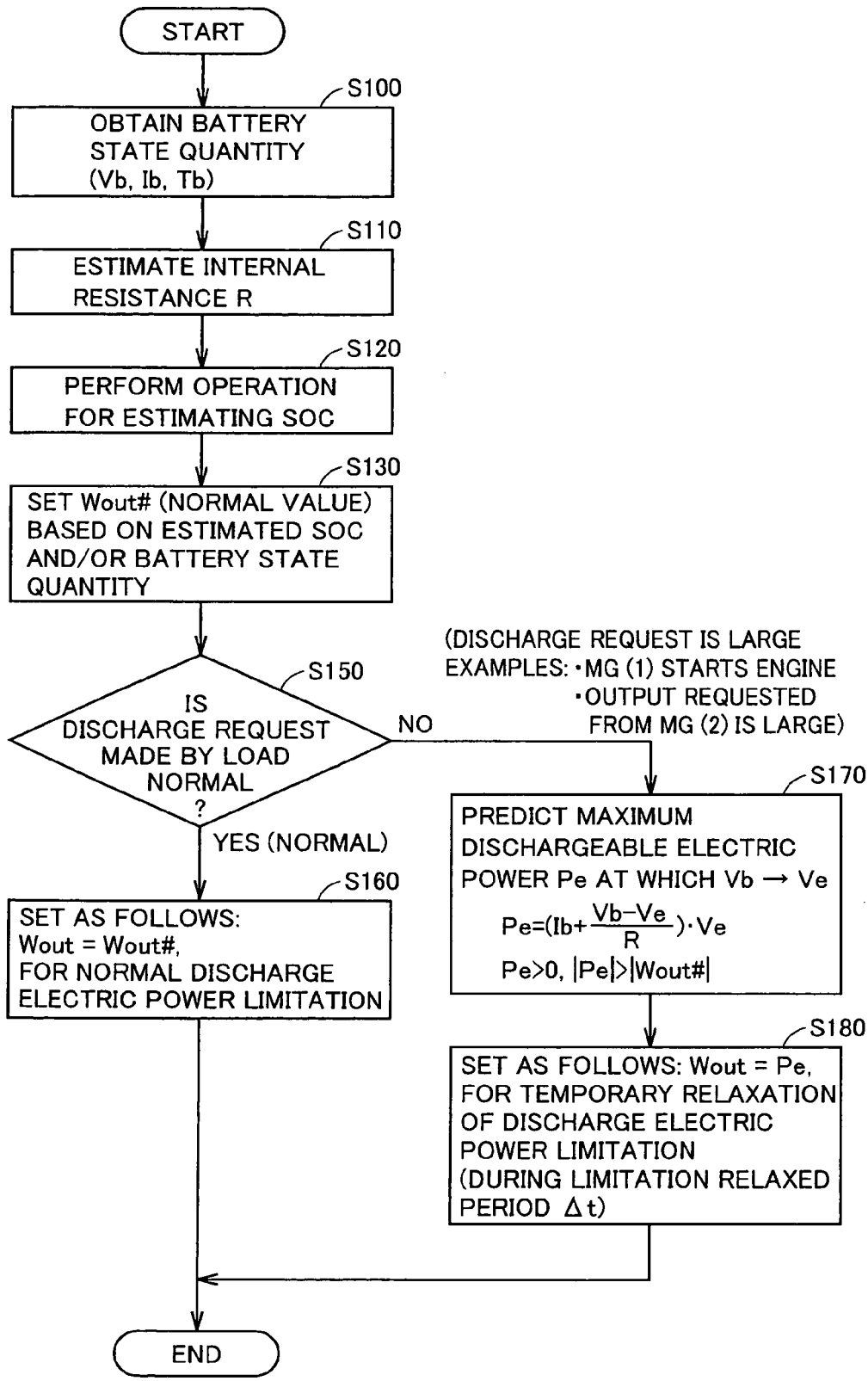
FIG. 3 is a flowchart for describing setting of a discharge electric power permissible value according to the embodiment of the present invention.

FIG. 3 is a flowchart for describing setting of a discharge electric power permissible value according to the embodiment of the present invention. The flowchart shown in FIG. 3 is executed by battery ECU 260 in prescribed cycles.

With reference to FIG. 3, battery ECU 260 obtains in step S110 a battery state quantity (battery voltage Vb, battery current Ib, and battery temperature Tb) from values detected by current sensor 222, temperature sensor 224, and voltage sensor 226.

Further in step S110, battery ECU 260 estimates internal resistance R based on the battery state quantity obtained in step S100. A technique of estimating internal resistance in step S110 is not particularly limited, and a well-known estimation technique may arbitrarily be used. For example, if the battery is of a type in which internal resistance R is temperature-dependent, internal resistance R can be estimated by creating a map that reflects properties of internal resistance R and battery temperature Tb determined in advance by an experiment or the like, and referring to the relevant map with the use of battery temperature Tb obtained in step S100. Alternatively, as disclosed in Patent Document 4 as well, internal resistance R can be estimated by referring as appropriate to actually-measured values of battery current Ib and battery voltage Vb, and applying a least-squares method or the like to thereby successively determine (Vb/Ib).

Note that in the case where the power storage device is configured with a capacitor, it is also possible to estimate internal resistance R based on the battery state quantity obtained in step S100, as in the case described above.

Further in step S120, battery ECU 260 estimates SOC based on the battery state quantity obtained in step S100. To estimate the SOC, a well-known estimation technique may also be used arbitrarily. For example, the SOC can be estimated by substituting the battery state quantity obtained in step S100 into a battery model equation and thereby successively estimating an open-circuit voltage (OCV). Alternatively, the SOC can be estimated by tracing changes in SOC based on a summation of battery current Ib. Alternatively, the SOC can be estimated by combining the SOC estimation based on the battery model and the SOC estimation by current integration.

Further in step S130, battery ECU 260 sets a basic discharge electric power permissible value Wout# (Wout#≥0) based on the estimated SOC determined in step S120 and/or the battery state quantity (typically battery temperature Tb) determined in step S110. For example, basic discharge electric power permissible value (Wout#) is set such that, even if discharge at Wout# is continued for prescribed time, a voltage change in battery voltage Vb falls within a prescribed range.

Subsequently in step S150, battery ECU 260 determines whether or not a discharge request made by the load is in a normal level. The determination in step S150 is made based on the request flag from HV_ECU 320. The request flag is set such that NO determination is obtained in step S150 in accordance with a circumstance of the load of the battery, in other words, when a discharge request made by the load to the battery is large, namely, in a circumstance where electric power output from battery 220 for running is desired to be temporarily increased relative to that in a normal state. For example, in the hybrid vehicle according to the present embodiment, the request flag is set such that NO determination is obtained in step S150, in a driving circumstance where electric power output from battery 220 for running is desired to be temporarily increased relative to that in a normal state, such as when the engine is started by motor generator 140B (MG (1)), or when an output requested from motor generator 140A (MG (2)) becomes larger than a prescribed output owing the accelerator pedal being manipulated.

If YES determination is obtained in step S150, namely, if a discharge request made by the load is in a normal level, battery ECU 260 performs in step S160 normal discharge limitation by setting basic discharge electric power permissible value Wout#, which is set in step S130, to discharge electric power permissible value Wout (Wout=Wout#).

In contrast, if NO determination is obtained in step S150, namely, if a discharge request made by the load is large, battery ECU 260 temporarily relaxes, in steps S170 and S180, the discharge limitation relative to that in a normal state. In order not to allow battery voltage Vb to decrease below lower limit voltage Ve owing to such relaxation of the discharge limitation, a discharge electric power permissible value adopted at temporary relaxation of the discharge limitation is determined as follows.

In step S170, based on battery voltage Vb and battery current Ib at present, battery ECU 260 predicts a maximum dischargeable electric power Pe (Pe>0), which is identified as discharge electric power at which battery voltage Vb decreases to lower limit voltage Ve as the battery current is increased (in a positive direction) by the relaxation of the discharge limitation.

Figure 4:
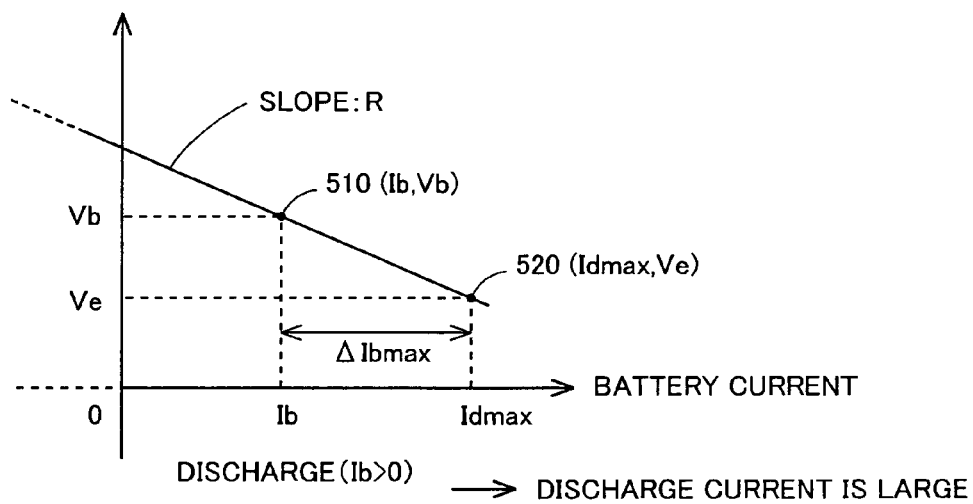
FIG. 4 is a conceptual diagram for describing a technique of predicting a maximum dischargeable electric power.

FIG. 4 is a conceptual diagram for describing a technique of predicting a maximum dischargeable electric power at this time.

With reference to FIG. 4, an operating point 510 corresponds to battery current Ib and battery voltage Vb at present. At an operating point 520 at which maximum dischargeable electric power Pe is output, a battery current is identified as a maximum dischargeable current Idmax and a battery voltage is identified as lower limit voltage Ve. At this time, operating points 510 and 520 are located on a straight line that has a slope equivalent to estimated internal resistance R at present.

Therefore, it is possible to predict operating point 520 at which a battery voltage reaches lower limit voltage Ve at relaxation of the discharge limitation, as a relative value with respect to battery voltage Vb and battery current Ib at present. In other words, a current difference between battery current Ib at present and maximum dischargeable current Idmax at operating point 520, namely, a discharge current permissible increased quantity ΔIbmax can be predicted as follows: ΔIbmax=(Vb−Ve)/R.

Reference is made again to FIG. 3. As a result, maximum dischargeable electric power Pe (|Pe|>|Wout#|) can be predicted in accordance with expression (1) below.

$$Pe=(Ib+\Delta Ib\max)\cdot Ve=(Ib+(Vb-Ve)/R)\cdot Ve \quad (1)$$

Further in step S180, battery ECU 260 sets discharge electric power permissible value Wout such that it corresponds to maximum dischargeable electric power Pe exclusively during a limitation relaxed period Δt, for temporary discharge electric power limitation. Typically, discharge electric power permissible value Wout may be set as follows: Wout=Pe. However, Wout may be set as follows: Wout<Pe, with a margin provided. Note that the request flag from HV_ECU 320 is changed such that, if a period for which the discharge electric power limitation is temporarily relaxed exceeds limitation relaxed period Δt, YES determination is obtained in step S150.

With such a configuration, it is possible to predict maximum dischargeable electric power Pe at which battery voltage Vb reaches lower limit voltage Ve owing to relaxation of discharge limitation, based on battery voltage Vb and battery current Ib at present, and determine discharge electric power permissible value Wout at which the charge/discharge limitation is relaxed relative to that in a normal state, such that Wout corresponds to the predicted maximum dischargeable electric power. Accordingly, when the discharge limitation is temporarily relaxed in accordance with a request made by the load, it is possible to prevent an output voltage of battery 220 for running (power storage device) from decreasing below a lower limit voltage, and sufficiently ensure a relaxed level of electric power on which the discharge limitation is imposed.

Next, charge electric power limitation according to the embodiment of the present invention will be described with the use of FIG. 5 and FIG. 6.

Figure 5:
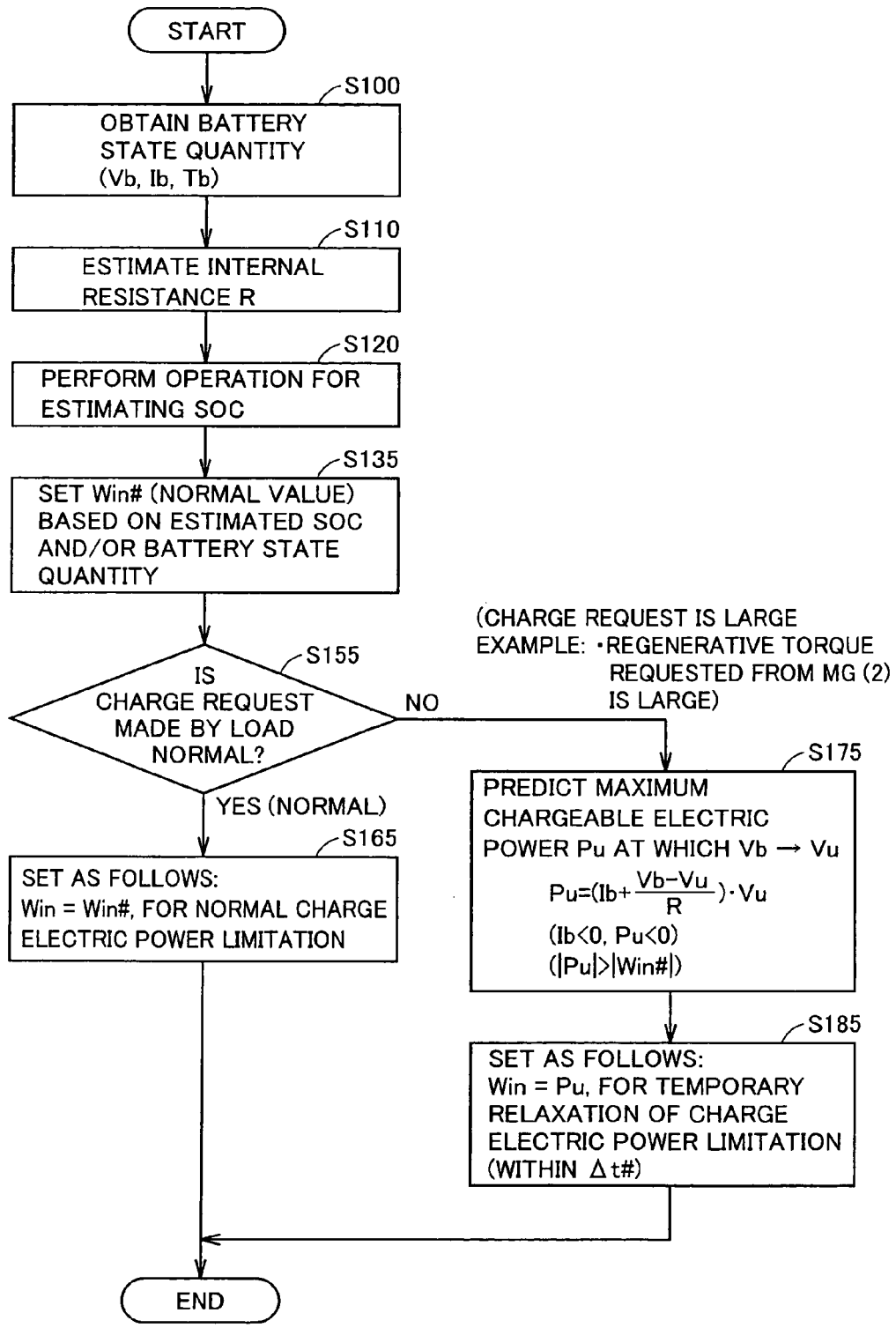
FIG. 5 is a flowchart for describing setting of a charge electric power permissible value according to the embodiment of the present invention.

FIG. 5 is a flowchart for describing setting of a charge electric power permissible value according to the embodiment of the present invention. The flowchart shown in FIG. 5 is executed by battery ECU 260 in prescribed cycles.

With reference to FIG. 5, battery ECU 260 obtains a battery state quantity (battery voltage Vb, battery current Ib, and battery temperature Tb) (S100), estimates internal resistance R (S110), and estimates SOC (S120), as in the same processing as that of steps S100-S120 in FIG. 3.

Further in step S135, battery ECU 260 sets a basic charge electric power permissible value Win# (Win#≤0) based on the estimated SOC determined in step S120 and/or the battery state quantity (typically battery temperature Tb) determined in step S110. For example, basic charge electric power permissible value (Win#) is set such that, even if charge at Win# is continued for prescribed time, a voltage change in battery voltage Vb falls within a prescribed range.

Subsequently in step S155, battery ECU 260 determines whether or not a charge request made by the load is in a normal level. The determination in step S155 is also made based on the request flag from HV_ECU 320. The request flag is set such that NO determination is obtained in step S155 in accordance with a circumstance of the load of the battery, in other words, when a charge request made by the load to the battery is large, namely, in a circumstance where electric power input to battery 220 for running is desired to be temporarily increased relative to that in a normal state. For example, in the hybrid vehicle according to the present embodiment, the request flag is set such that NO determination is obtained in step S155 in a driving circumstance where electric power input to battery 220 for running is desired to be temporarily increased relative to that in a normal state by increasing electric power regeneratively generated by motor generator 140A, such as when a magnitude (an absolute value) of regenerative torque requested from motor generator 140A becomes equal to or larger than a prescribed magnitude owing to the driver's manipulation of the brake.

For example, there occurs the above-described case where a magnitude (an absolute value) of regenerative torque requested from motor generator 140A becomes equal to or larger than a prescribed magnitude, when the brake is manipulated during running at a high speed equal to or higher than a prescribed speed, or when a degree of deceleration is large owing to the brake manipulation or the like even during running at a relatively low speed.

If YES determination is obtained in step S155, namely, if a charge request made by the load is in a normal level, battery ECU 260 performs in step S165 normal charge limitation by setting basic charge electric power permissible value Win#, which is set in step S135, to charge electric power permissible value Win (Win=Win#).

In contrast, if NO determination is obtained in step S155, namely, if a charge request made by the load is large, battery ECU 260 temporarily relaxes, in steps S175 and S185, the charge limitation relative to that in a normal state. In order not to allow battery voltage Vb to increase above upper limit voltage Vu owing to such relaxation of the charge limitation, a charge electric power permissible value adopted at temporary relaxation of the charge limitation is determined as follows.

In step S175, based on battery voltage Vb and battery current Ib at present, battery ECU 260 predicts a maximum chargeable electric power Pu (Pu<0), which is identified as charge electric power at which battery voltage Vb increases to upper limit voltage Vu as the battery current is increased (in a negative direction) by the relaxation of the charge limitation.

Figure 6:
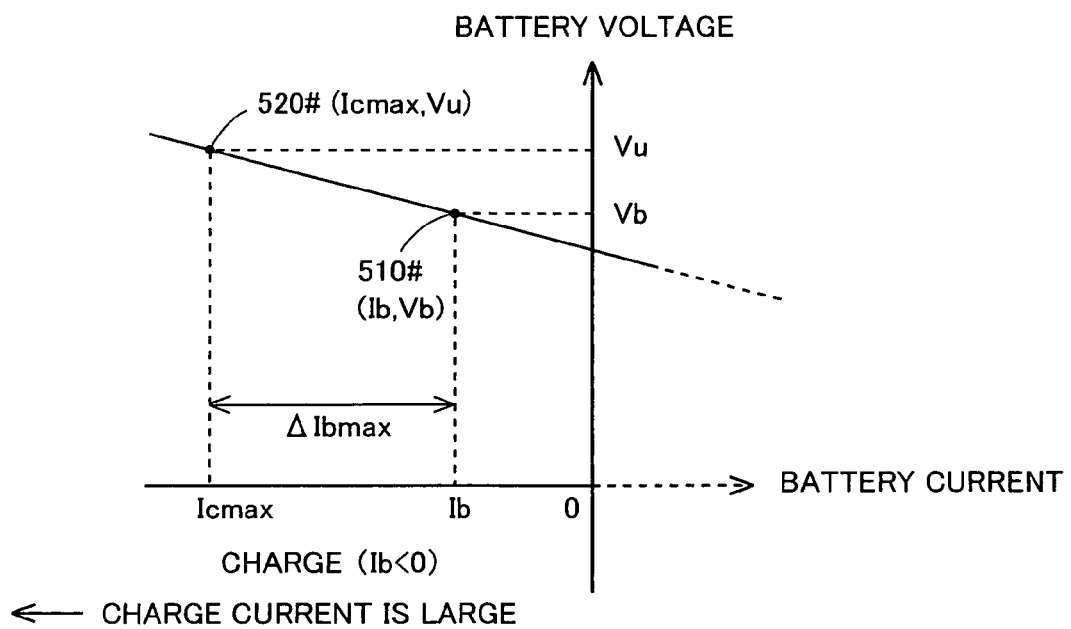
FIG. 6 is a conceptual diagram for describing a technique of predicting a maximum chargeable electric power.

FIG. 6 is a conceptual diagram for describing a technique of predicting a maximum chargeable electric power at this time.

With reference to FIG. 6, an operating point 510# corresponds to battery current Ib and battery voltage Vb at present. At an operating point 520# at which maximum chargeable electric power Pu is input, a battery current is identified as a maximum chargeable current Icmax, and a battery voltage is identified as upper limit voltage Vu. At this time, operating points 510# and 520# are located on a straight line that has a slope equivalent to estimated internal resistance R at present.

Therefore, it is possible to predict operating point 520# at which a battery voltage reaches upper limit voltage Vu at the relaxation of the charge limitation, as a relative value with respect to battery voltage Vb and battery current Ib at present. In other words, a current difference between battery current Ib at present and maximum chargeable current Icmax at operating point 520#, namely, a charge current permissible increased quantity $\Delta Ibmax$ can be predicted as follows: $\Delta Ibmax=(Vb-Vu)/R$.

Reference is made again to FIG. 5. As a result, maximum chargeable electric power Pu(|Pu|>|Win#|) can be predicted in accordance with expression (2) below.

$$Pu=(Ib+\Delta Ibmax)\cdot Ve=(Ib+(Vb-Vu)/R)\cdot Vu \qquad (2)$$

Further in step S185, battery ECU 260 sets charge electric power permissible value Win such that it corresponds to maximum chargeable electric power Pu exclusively during a limitation relaxed period $\Delta t\#$, for temporary charge electric power limitation. Typically, charge electric power permissible value Win may be set as follows: Win=Pu. However, Win may be set as follows: |Win|<|Pu|, with a margin provided. Note that the request flag from HV_ECU 320 is changed such that, if a period for which the charge electric power limitation is temporarily relaxed exceeds limitation relaxed period $\Delta t$, YES determination is obtained in step S155.

With such a configuration, it is possible to predict maximum chargeable electric power Pu at which battery voltage Vb reaches upper limit voltage Vu owing to relaxation of charge limitation, based on battery voltage Vb and battery current Ib at present, and determine charge electric power permissible value Win at which the charge limitation is relaxed relative to that in a normal state, such that Win corresponds to the predicted maximum chargeable electric power. Accordingly, when the charge limitation is temporarily relaxed in accordance with a request made by the load, it is possible to prevent an output voltage of the power storage device (battery 220 for running) from increasing above an upper limit voltage, and sufficiently ensure a relaxed level of electric power on which the charge limitation is imposed.

In the charge/discharge control for the power storage device according to the embodiment of the present invention, by setting a charge/discharge electric power permissible value, as described above, it is possible to perform the charge/discharge control such that an output voltage is maintained within a controlled voltage range, while allowing the power storage device to sufficiently exhibit its performance. Note that, as a minimum configuration to implement the present invention, it is also possible to adopt a configuration in which only one of the charge electric power permissible value and the discharge electric power permissible value is set in accordance with the flowchart in FIG. 3 or FIG. 5.

In the present embodiment, setting of the charge/discharge electric power permissible value has been shown as an example, in the case configured such that charge/discharge limitation for a power storage device (e.g. a battery for running, an electric double layer capacitor, or the like) mounted on a hybrid vehicle (an electric-powered vehicle) is enabled, in other words, both of electric power supply from a power storage device to a load (discharge) and electric power supply from the load to the power storage device (charge) are enabled. However, application of the present invention is not limited to such a case. In other words, even in the case configured such that only one of electric power supply from the power storage device to the load (discharge) and electric power supply from the load to the power storage device (charge) is performed, it is possible to apply the present invention to set a discharge electric power permissible value or a charge electric power permissible value at that time. In other words, it is notably described that the present invention can be equally applied to the setting of a charge/discharge electric power permissible value for maintaining an output voltage of the power storage device within a voltage range from a lower limit voltage to an upper limit voltage, without limiting the configuration of the load.

Note that, in the flowcharts in FIG. 3 and FIG. 5, step S100 corresponds to the "state obtaining means" or the "step of obtaining" in the present invention, that step S110 corresponds to the "internal resistance estimating means" or the "step of estimating" in the present invention, and that steps S130 and S135 correspond to the "first limitation setting means" or the "step of setting" in the present invention. Further, steps S170 and S180 and steps S175 and S185 correspond to the "second limitation setting means" or the "step of relaxing" in the present invention. In particular, steps S170 and S175 correspond to the "predicting means" or the "substep of predicting" in the present invention, and steps S180 and S185 correspond to the "permissible value setting means" or the "substep of setting" in the present invention.

It should be understood that the embodiment disclosed herein is illustrative and not limitative in all aspects. The scope of the present invention is shown not by the description above but by the scope of the claims, and is intended to include all modifications within the equivalent meaning and scope of the claims.

The invention claimed is:

1. A charge/discharge control device for a power storage device mounted on an electric-powered vehicle, comprising:
    first limitation setting means for controlling charge and discharge of said power storage device to limit a charge/discharge power within a limit range from a discharge electric power permissible value to a charge electric power permissible value which are set based on a state of said power storage device; and
    second limitation setting means for temporarily permitting a charge/discharge power beyond said limit range of said first limitation setting means, (i) in response to a manipulation of a brake pedal to or beyond a prescribed degree, or (ii) in response to a manipulation of an accelerator pedal to or beyond a prescribed degree,
    said second limitation setting means including control means for controlling charge and discharge of said power storage device such that an output voltage of said power storage device is maintained within a voltage range from a lower limit voltage to an upper limit voltage.

2. The charge/discharge control device for the power storage device according to claim 1, further comprising:
    internal resistance estimating means for estimating internal resistance of said power storage device,
    said control means including:
        predicting means for predicting discharge electric power or charge electric power of said power storage device at which said output voltage reaches said lower limit voltage or said upper limit voltage owing to increase in discharge current or charge current from a battery current at present, based on a battery voltage and a battery current at present and said internal resistance estimated by said internal resistance estimating means; and
        means for controlling charge/discharge power of said power storage device not to exceed the discharge electric power or the charge electric power estimated by said predicting means.

3. The charge/discharge control device for the power storage device according to claim 2,
    said internal resistance estimating means having means for estimating said internal resistance of said power storage device based on a battery temperature at present, in accordance with a predetermined characteristic between the temperature and the internal resistance of said power storage device.

4. A charge/discharge control method for a power storage device mounted on an electric-powered vehicle, comprising the steps of:
    controlling charge and discharge of said power storage device to limit a charge/discharge power within a limit range from a discharge electric power permissible value to a charge electric power permissible value which are set based on a state of said power storage device; and
    temporarily permitting a charge/discharge power beyond said limit range of said step of controlling, (i) in response to a manipulation of a brake pedal to or beyond a prescribed degree, or (ii) in response to a manipulation of an accelerator pedal to or beyond a prescribed degree,
    said step of temporarily permitting including the step of:
    controlling charge and discharge of said power storage device such that an output voltage of said power storage device is maintained within a voltage range from a lower limit voltage to an upper limit voltage.

5. The charge/discharge control method for the power storage device according to claim 4, further comprising the step of:
    estimating internal resistance of said power storage device, wherein
    said step of temporarily permitting includes the steps of:
    predicting discharge electric power or charge electric power of said power storage device at which said output voltage reaches said lower limit voltage or said upper limit voltage owing to increase in discharge current or charge current from a battery current at present, based on a battery voltage and a battery current at present and said internal resistance estimated in said step of estimating; and
    controlling charge/discharge power of said power storage device not to exceed the discharge electric power or the charge electric power estimated in said step of estimating.

6. The charge/discharge control method for the power storage device according to claim 5, wherein
    said step of estimating includes the step of estimating said internal resistance of said power storage device based on a battery temperature at present, in accordance with a predetermined characteristic between the temperature and the internal resistance of said power storage device.

7. An electric-powered vehicle, comprising:
    a power storage device, and
    a charge/discharge control device for said power storage device,
    wherein said charge/discharge control device
    controls charge and discharge of said power storage device to limit a charge/discharge power within a limit range from a discharge electric power permissible value to a charge electric power permissible value which are set based on a state of said power storage device; and
    temporarily permits a charge/discharge power beyond said limit range, (i) in response to a manipulation of a brake pedal to or beyond a prescribed degree, or (ii) in response to a manipulation of an accelerator pedal to or beyond a prescribed degree, and
    controls charge and discharge of said power storage device such that an output voltage of said power storage device is maintained within a voltage range from a lower limit voltage to an upper limit voltage, when the charge/discharge power beyond said limit range is temporarily permitted.

8. The electric-powered vehicle according to claim 7, wherein
said charge/discharge control device
estimates internal resistance of said power storage device,
predicts discharge electric power or charge electric power of said power storage device at which said output voltage reaches said lower limit voltage or said upper limit voltage owing to increase in discharge current or charge current from a battery current at present, based on a battery voltage and a battery current at present and the estimated internal resistance, and
controls charge/discharge power of said power storage device not to exceed the predicted discharge electric power or the charge electric power, when the charge/discharge power beyond said limit range is temporarily permitted.

9. The electric-powered vehicle according to claim 8, wherein
said charge/discharge control device
estimates said internal resistance of said power storage device based on a battery temperature at present, in accordance with a predetermined characteristic between the temperature and the internal resistance of said power storage device.

10. A charge/discharge control device for a power storage device, for maintaining an output voltage of the power storage device within a voltage range from a lower limit voltage to an upper limit voltage, comprising:
state obtaining means for obtaining measurement values which indicate the state of said power storage device;
first limitation setting means for setting, based on the state of said power storage device, a discharge electric power permissible value and a charge electric power permissible value for charge/discharge electric power limitation for said power storage device;
second limitation setting means for temporarily relaxing said charge/discharge electric power limitation relative to the charge/discharge electric power permissible value set by said first limitation setting means, in accordance with a request from a load of said power storage device, the request from the load being higher than in a normal load state and reflecting (i) a manipulation of a brake pedal to or beyond a prescribed degree or (ii) a manipulation of an accelerator pedal to or beyond a prescribed degree; and
internal resistance estimating means for estimating internal resistance of said power storage device, based on said measurement values obtained by said state obtaining means,
said second limitation setting means including
predicting means for predicting, upon receipt of the request from the load of said power storage device, at least one of discharge electric power and charge electric power of said power storage device at which said output voltage reaches said lower limit voltage and said upper limit voltage owing to increase in discharge electric power and charge electric power, respectively, based on a battery voltage and a battery current in said measurement values obtained by said state obtaining means and said internal resistance estimated by said internal resistance estimating means, and
permissible value setting means for temporarily setting at least one of said discharge electric power permissible value and said charge electric power permissible value, in accordance with at least one of said discharge electric power and said charge electric power predicted by said predicting means,
wherein the at least one of said discharge electric power permissible value and said charge electric power permissible value temporarily set by the permissible value setting means of the second limitation setting means allows at least one of (i) a greater discharge of electric power than the discharge electric power permissible value set by the first limitation setting means and (ii) a greater charge of electric power than the charge electric power permissible value set by the first limitation setting means.

11. The charge/discharge control device for the power storage device according to claim 10, wherein said predicting means determines a discharge current permissible increased quantity of said power storage device by dividing a voltage difference between said battery voltage at present and said lower limit voltage by said internal resistance, and predicts said discharge electric power at which said output voltage reaches said lower limit voltage, in accordance with multiplication of said lower limit voltage and a discharge current which is expressed as a sum of said discharge current permissible increased quantity and said battery current.

12. An electric-powered vehicle, including
said power storage device,
an internal combustion engine for generating vehicle drive power,
a first electric motor and a second electric motor each configured to be able to receive electric power from and transmit electric power to said power storage device in a bidirectional manner, and
the charge/discharge control device recited in claim 11,
said first electric motor being configured to be able to start the internal combustion engine, by being driven and rotated by discharge electric power of said power storage device,
said second electric motor being configured to be able to generate said vehicle drive power by the discharge electric power of said power storage device independently of said internal combustion engine, and
said charge/discharge control device setting said discharge electric power permissible value by said second limitation setting means, at least one of when said internal combustion engine is started, and when an output request to said second electric motor is at least a prescribed level.

13. The charge/discharge control device for the power storage device according to claim 10, wherein said predicting means determines a charge current permissible increased quantity of said power storage device by dividing a voltage difference between said battery voltage at present and said upper limit voltage by said internal resistance, and predicts said charge electric power at which said output voltage reaches said upper limit voltage, in accordance with multiplication of said upper limit voltage and a charge current which is expressed as a sum of said charge current permissible increased quantity and said battery current.

14. An electric-powered vehicle, including
said power storage device,
an internal combustion engine for generating vehicle drive power,
an electric motor configured to be able to receive electric power from and transmit electric power to said power storage device in a bidirectional manner, and
the charge/discharge control device for the power storage device recited in claim 13,
said electric motor being configured to be able to generate said vehicle drive power by discharge electric power of said power storage device independently of said internal combustion engine, and to be able to generate charge electric power of said power storage device by regenerative braking power generation caused by regenerative torque being generated when said electric-powered vehicle is decelerated, and said charge/discharge control device setting said charge electric power permissible value by said second limitation setting means, when an absolute value of said regenerative torque requested from said electric motor is determined to be at least a prescribed value.

15. An electric-powered vehicle, including
said power storage device,
an internal combustion engine for generating vehicle drive power,
a first electric motor and a second electric motor each configured to be able to receive electric power from and transmit electric power to said power storage device in a bidirectional manner, and
the charge/discharge control device recited in claim 10,
said first electric motor being configured to be able to start the internal combustion engine, by being driven and rotated by discharge electric power of said power storage device,
said second electric motor being configured to be able to generate said vehicle drive power by the discharge electric power of said power storage device independently of said internal combustion engine, and
said charge/discharge control device setting said discharge electric power permissible value by said second limitation setting means, at least one of when said internal combustion engine is started, and when an output request to said second electric motor is at least a prescribed level.

16. An electric-powered vehicle, including
said power storage device,
an internal combustion engine for generating vehicle drive power,
an electric motor configured to be able to receive electric power from and transmit electric power to said power storage device in a bidirectional manner, and
the charge/discharge control device for the power storage device recited in claim 10,
said electric motor being configured to be able to generate said vehicle drive power by discharge electric power of said power storage device independently of said internal combustion engine, and to be able to generate charge electric power of said power storage device by regenerative braking power generation caused by regenerative torque being generated when said electric-powered vehicle is decelerated, and
said charge/discharge control device setting said charge electric power permissible value by said second limitation setting means, when an absolute value of said regenerative torque requested from said electric motor is determined to be at least a prescribed value.

17. The charge/discharge control device for the power storage device according to claim 10, wherein the first and second limitation setting means are separate units,
the second limitation setting means further includes determining means for determining whether there is a large load request, wherein
if it is determined that there is a large load request, the second limitation setting means is used to temporarily relax for maintaining the output voltage; and
if it is determined that there is no large load request, the charge/discharge electric power permissible values set by the first limitation setting means are used to maintain the output voltage,
the determination being perfotined only by the second limitation setting means but not by the first limitation setting means.

18. The charge/discharge control device for the power storage device according to claim 10, wherein said lower limit voltage or said upper limit voltage is reached, upon a change from the battery voltage at present, owing to increase in one of a discharge current and a charge current from the battery current at present.

19. A charge/discharge control method for a power storage device, for maintaining an output voltage of the power storage device within a voltage range from a lower limit voltage to an upper limit voltage, comprising the steps of:
obtaining measurement values which indicate a state of said power storage device;
setting, based on a state of said power storage device, a discharge electric power permissible value and a charge electric power permissible value for charge/discharge electric power limitation for said power storage device;
temporarily relaxing said charge/discharge electric power limitation relative to the charge/discharge electric power permissible value set by said setting step in accordance with a request from a load of said power storage device, the request from the load being higher than in a normal load state and reflecting (i) a manipulation of a brake pedal to or beyond a prescribed degree or (ii) a manipulation of an accelerator pedal to or beyond a prescribed degree; and
estimating internal resistance of said power storage device, based on said measurement values obtained by said obtaining step,
said relaxing step including the substeps of
predicting, upon receipt of the request from the load of said power storage device, at least one of discharge electric power and charge electric power of said power storage device at which said output voltage reaches said lower limit voltage and said upper limit voltage owing to increase in discharge electric power and charge electric power, respectively, based on a battery voltage and a battery current in said measurement values obtained by said obtaining step and said internal resistance estimated by said estimating step, and
temporarily setting at least one of said discharge electric power permissible value and said charge electric power permissible value, in accordance with at least one of said discharge electric power and said charge electric power predicted by said predicting substep,
wherein the at least one of said discharge electric power permissible value and said charge electric power permissible value temporarily set by the relaxing step allows at least one of (i) a greater discharge of electric power than the discharge electric power permissible value set by the setting step and (ii) a greater charge of electric power than the charge electric power permissible value set by the setting step.

20. The charge/discharge control method for the power storage device according to claim 19, wherein said predicting substep determines a discharge current permissible increased quantity of said power storage device by dividing a voltage difference between said battery voltage at present and said lower limit voltage by said internal resistance, and predicts said discharge electric power at which said output voltage reaches said lower limit voltage, in accordance with multiplication of said lower limit voltage and a discharge current which is expressed as a sum of said discharge current permissible increased quantity and said battery current.

21. The charge/discharge control method for the power storage device according to claim 19, wherein said predicting substep determines a charge current permissible increased quantity of said power storage device by dividing a voltage difference between said battery voltage at present and said upper limit voltage by said internal resistance, and predicts said charge electric power at which said output voltage reaches said upper limit voltage, in accordance with multiplication of said upper limit voltage and a charge current which is expressed as a sum of said charge current permissible increased quantity and said battery current.

22. The charge/discharge control method for the power storage device according to claim 19, wherein
said power storage device is mounted on an electric-powered vehicle which includes an internal combustion engine for generating vehicle drive power and a first electric motor a second electric motor each configured to be able to receive electric power from and transmit electric power to said power storage device in a bidirectional manner,
said first electric motor being configured to be able to start the internal combustion engine, by being driven and rotated by discharge electric power of said power storage device,
said second electric motor being configured to be able to generate said vehicle drive power by the discharge electric power of said power storage device independently of said internal combustion engine, and
said relaxing step sets said discharge electric power permissible value by said setting substep, at least one of when said internal combustion engine is started, and when an output request to said second electric motor is at least a prescribed level.

23. The charge/discharge control method for the power storage device according to claim 19, wherein
said power storage device is mounted on an electric-powered vehicle which includes an internal combustion engine for generating vehicle drive power and an electric motor configured to be able to receive electric power from and transmit electric power to said power storage device in a bidirectional manner,
said electric motor is configured to be able to generate said vehicle drive power by discharge electric power of said power storage device independently of said internal combustion engine, and to be able to generate charge electric power of said power storage device by regenerative braking power generation caused by regenerative torque being generated when said electric-powered vehicle is decelerated, and
said relaxing step sets said charge electric power permissible value by said setting substep, when an absolute value of said regenerative torque requested from said electric motor is determined to be at least a prescribed value.

24. The charge/discharge control method for the power storage device according to claim 20, wherein
said power storage device is mounted on an electric-powered vehicle which includes an internal combustion engine for generating vehicle drive power and a first electric motor a second electric motor each configured to be able to receive electric power from and transmit electric power to said power storage device in a bidirectional manner,
said first electric motor being configured to be able to start the internal combustion engine, by being driven and rotated by discharge electric power of said power storage device,
said second electric motor being configured to be able to generate said vehicle drive power by the discharge electric power of said power storage device independently of said internal combustion engine, and
said relaxing step sets said discharge electric power permissible value by said setting substep, at least one of when said internal combustion engine is started, and when an output request to said second electric motor is at least a prescribed level.

25. The charge/discharge control method for the power storage device according to claim 21, wherein
said power storage device is mounted on an electric-powered vehicle which includes an internal combustion engine for generating vehicle drive power and an electric motor configured to be able to receive electric power from and transmit electric power to said power storage device in a bidirectional manner,
said electric motor is configured to be able to generate said vehicle drive power by discharge electric power of said power storage device independently of said internal combustion engine, and to be able to generate charge electric power of said power storage device by regenerative braking power generation caused by regenerative torque being generated when said electric-powered vehicle is decelerated, and
said relaxing step sets said charge electric power permissible value by said setting substep, when an absolute value of said regenerative torque requested from said electric motor is determined to be at least a prescribed value.

26. The charge/discharge control method for the power storage device according to claim 19, the relaxing step further including determining whether there is a large load request, wherein
if it is determined that there is a large load request, the charge/discharge electric power permissible values are temporarily relaxed for maintaining the output voltage; and
if it is determined that there is no large load request, the charge/discharge electric power permissible values are not relaxed for maintaining the output voltage value,
wherein:
setting the charge/discharge electric power permissible values is performed by a first limitation setting unit of a charge/discharge control device;
temporarily relaxing the charge/discharge electric power permissible values is performed by a second limitation setting unit of the charge/discharge control device, the second limitation setting unit being a separate unit from the first limitation setting unit; and
determining whether there is a large load request is performed by the second limitation setting unit and not by the first limitation setting unit.

27. The charge/discharge control method for the power storage device according to claim 19, wherein said lower limit voltage or said upper limit voltage is reached, upon a change from the battery voltage at present, owing to increase in one of a discharge current and a charge current from the battery current at present.

28. A charge/discharge control device for a power storage device, for maintaining an output voltage of the power storage device within a voltage range from a lower limit voltage to an upper limit voltage, comprising a controller that performs the steps of:

obtaining measurement values which indicate a state of said power storage device;

setting, based on a state of said power storage device, a discharge electric power permissible value and a charge electric power permissible value for charge/discharge electric power limitation for said power storage device;

temporarily relaxing said charge/discharge electric power limitation relative to the charge/discharge electric power permissible value set by said setting step in accordance with a request from a load of said power storage device, the request from the load being higher than in a normal load state and reflecting (i) a manipulation of a brake pedal to or beyond a prescribed degree or (ii) a manipulation of an accelerator pedal to or beyond a prescribed degree; and estimating internal resistance of said power storage device, based on said measurement values obtained by said obtaining step, said relaxing step including the substeps of predicting, upon receipt of the request from the load of said power storage device, at least one of discharge electric power and charge electric power of said power storage device at which said output voltage reaches said lower limit voltage and said upper limit voltage owing to increase in discharge electric power and charge electric power, respectively, based on a battery voltage and a battery current in said measurement values obtained by said obtaining step and said internal resistance estimated by said estimating step, and temporarily setting at least one of said discharge electric power permissible value and said charge electric power permissible value, in accordance with at least one of said discharge electric power and said charge electric power predicted by said predicting substep, wherein the at least one of said discharge electric power permissible value and said charge electric power permissible value temporarily set by the relaxing step allows at least one of (i) a greater discharge of electric power than the discharge electric power permissible value set by the setting step and (ii) a greater charge of electric power than the charge electric power permissible value set by the setting step.

29. An electric-powered vehicle, including said power storage device, an internal combustion engine for generating vehicle drive power, a first electric motor and a second electric motor each configured to be able to receive electric power from and transmit electric power to said power storage device in a bidirectional manner, and the charge/discharge control device recited in claim 28, said first electric motor being configured to be able to start the internal combustion engine, by being driven and rotated by discharge electric power of said power storage device, said second electric motor being configured to be able to generate said vehicle drive power by the discharge electric power of said power storage device independently of said internal combustion engine, and said controller setting said discharge electric power permissible value, at least one of when said internal combustion engine is started, and when an output request to said second electric motor is at least a prescribed level.

30. An electric-powered vehicle, including said power storage device, an internal combustion engine for generating vehicle drive power, an electric motor configured to be able to receive electric power from and transmit electric power to said power storage device in a bidirectional manner, and the charge/discharge control device for the power storage device recited in claim 28, said electric motor being configured to be able to generate said vehicle drive power by discharge electric power of said power storage device independently of said internal combustion engine, and to be able to generate charge electric power of said power storage device by regenerative braking power generation caused by regenerative torque being generated when said electric-powered vehicle is decelerated, and said controller setting said charge electric power permissible value, when an absolute value of said regenerative torque requested from said electric motor is determined to be at least a prescribed value.

31. The charge/discharge control device for the power storage device according to claim 28, wherein said lower limit voltage or said upper limit voltage is reached, upon a change from the battery voltage at present, owing to increase in one of a discharge current and a charge current from the battery current at present.

\* \* \* \* \*